United States Patent [19]

Marino et al.

[11] Patent Number: 4,594,789
[45] Date of Patent: Jun. 17, 1986

[54] WHEEL ALIGNMENT SYSTEM

[75] Inventors: Joseph A. Marino; Peter A. Puetz, both of Waukesha; Michael J. Kling, Mequon; Curtis A. Finn, Racine; John C. Pendell, West Allis; Michael C. Crawford, Milwaukee, all of Wis.

[73] Assignee: Bear Automotive Service Equipment Company, Milwaukee, Wis.

[21] Appl. No.: 725,759

[22] Filed: Apr. 22, 1985

[51] Int. Cl.$^4$ ............................................. G01B 11/275
[52] U.S. Cl. .................................. 33/288; 33/203.18; 356/155
[58] Field of Search ............. 33/180 AT, 203.18, 288; 356/152, 155

[56] References Cited

U.S. PATENT DOCUMENTS

| | | | |
|---|---|---|---|
| 3,782,831 | 1/1974 | Senften | 356/152 |
| 3,892,042 | 7/1975 | Senften | 33/301 |
| 3,913,236 | 10/1975 | Butler | 33/336 |
| 4,034,479 | 7/1977 | Senften | 33/203 |
| 4,095,902 | 6/1978 | Florer | 356/155 |
| 4,106,208 | 8/1978 | Hunter | 33/203 |
| 4,126,943 | 11/1978 | Senften | 33/228 |
| 4,130,362 | 12/1978 | Lill et al. | 33/288 |
| 4,138,825 | 2/1979 | Pelta | 33/228 |
| 4,143,970 | 3/1979 | Lill | 356/155 |
| 4,249,824 | 2/1981 | Wiederrich et al. | 356/155 |
| 4,278,350 | 7/1981 | Rawle et al. | 356/155 |
| 4,302,104 | 11/1981 | Hunter | 356/152 |
| 4,311,386 | 1/1982 | Coetsier | 33/288 |
| 4,319,838 | 3/1982 | Grossman | 356/152 |
| 4,444,496 | 4/1984 | Dale, Jr. | 356/155 |
| 4,455,759 | 6/1984 | Coetsier | 33/288 |
| 4,457,172 | 7/1984 | Mathes | 73/462 |
| 4,523,844 | 6/1985 | Titsworth et al. | 356/152 |

FOREIGN PATENT DOCUMENTS

| | | | |
|---|---|---|---|
| 2759556 | 8/1979 | Fed. Rep. of Germany | 356/155 |
| 76409 | 5/1982 | Japan | 356/155 |
| 2025064 | 6/1978 | United Kingdom . | |

OTHER PUBLICATIONS

Hunter, Lee, 3 Lines, 1978, pp. 1-15.

Primary Examiner—Richard R. Stearns
Attorney, Agent, or Firm—Kinney & Lange

[57] ABSTRACT

A wheel alignment system uses head units attached to each of the four wheels. The front head units contain photodetector arrays which view across the front of the vehicle and to the rear. The rear units carry photodetector arrays which look forward. Each photodetector array views a target on one of the other head units. A microcomputer in each head unit determines an angular value based upon the position of the target image on the photodetector array. The angle values determined by the microcomputers of the individual head units are supplied to a master computer in a main console which determines individual toe angles with respect to a tread centerline for either the front two wheels or for all four wheels. The master computer controls a display at the main console, as well as a remote display to guide the mechanic in making alignment adjustments.

20 Claims, 8 Drawing Figures

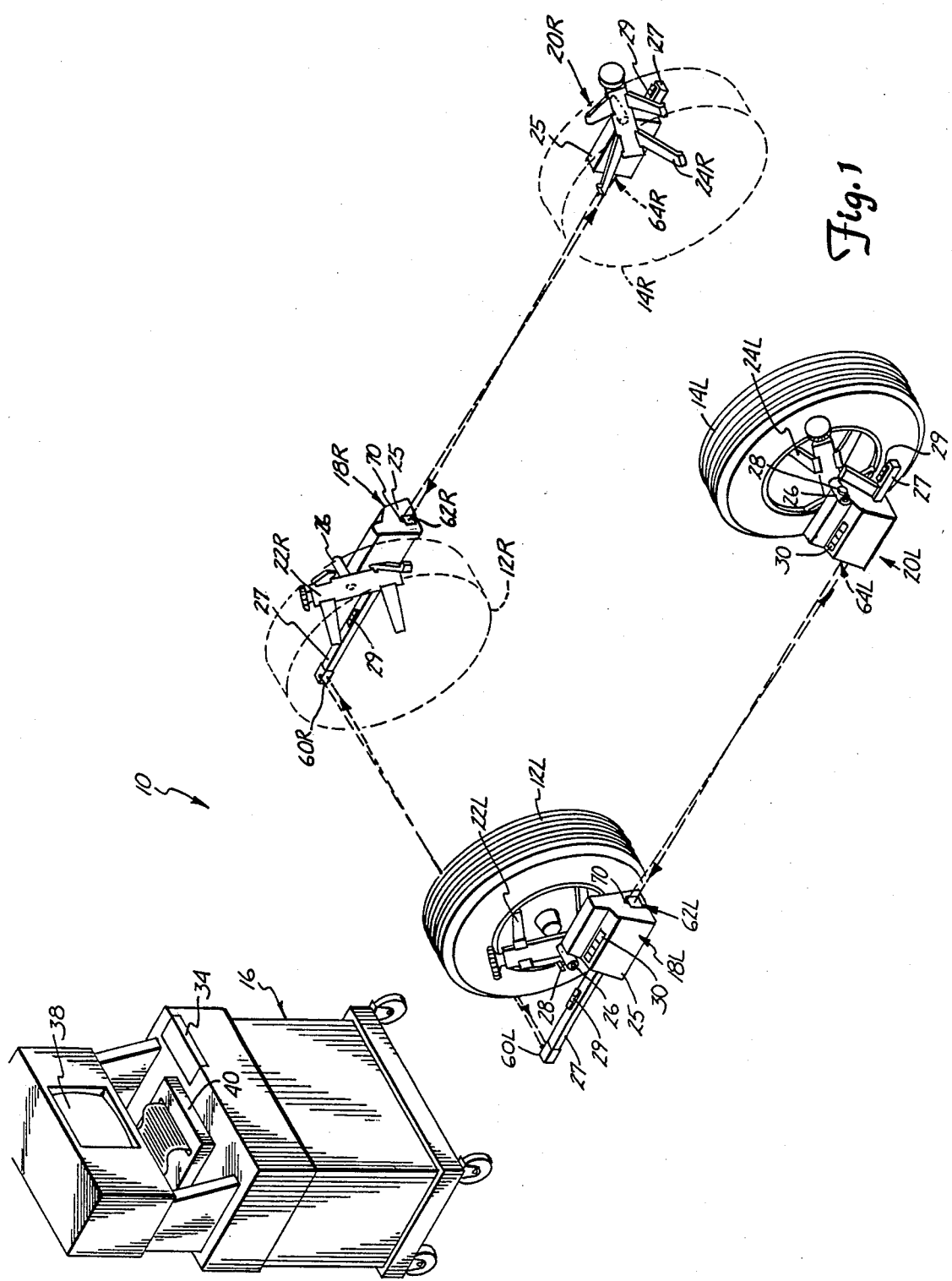

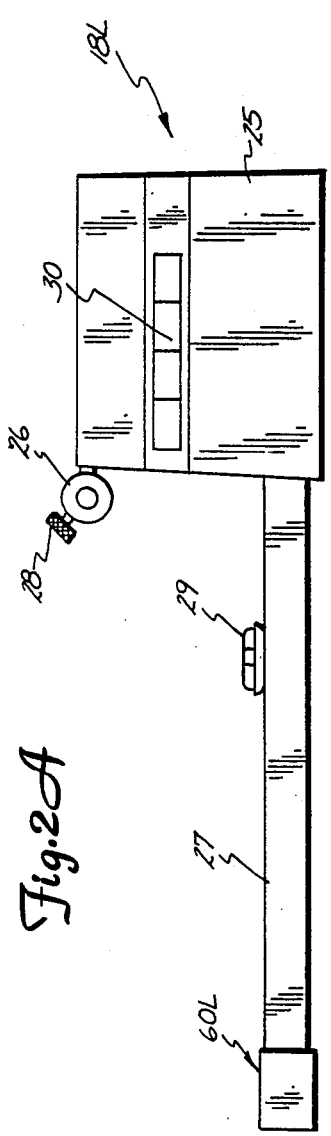
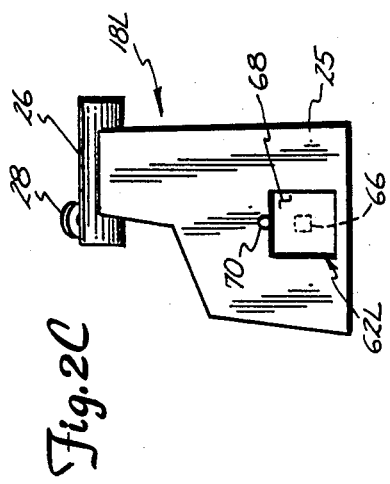
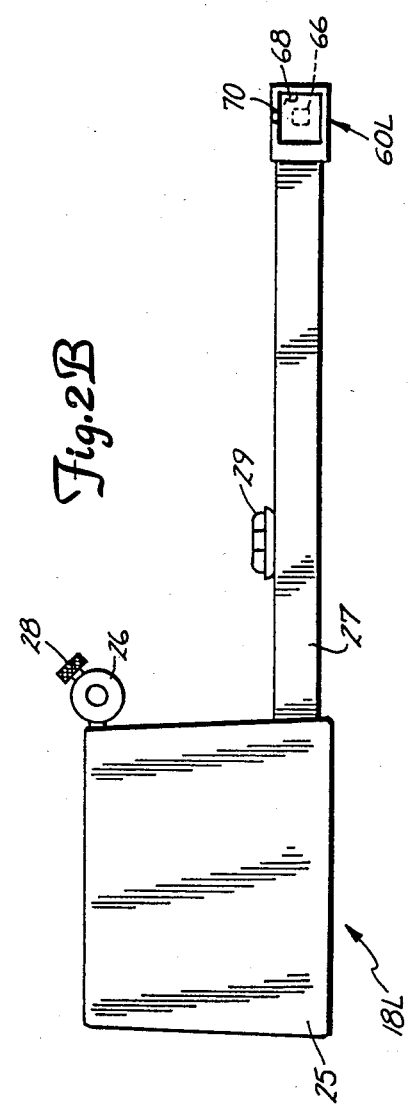

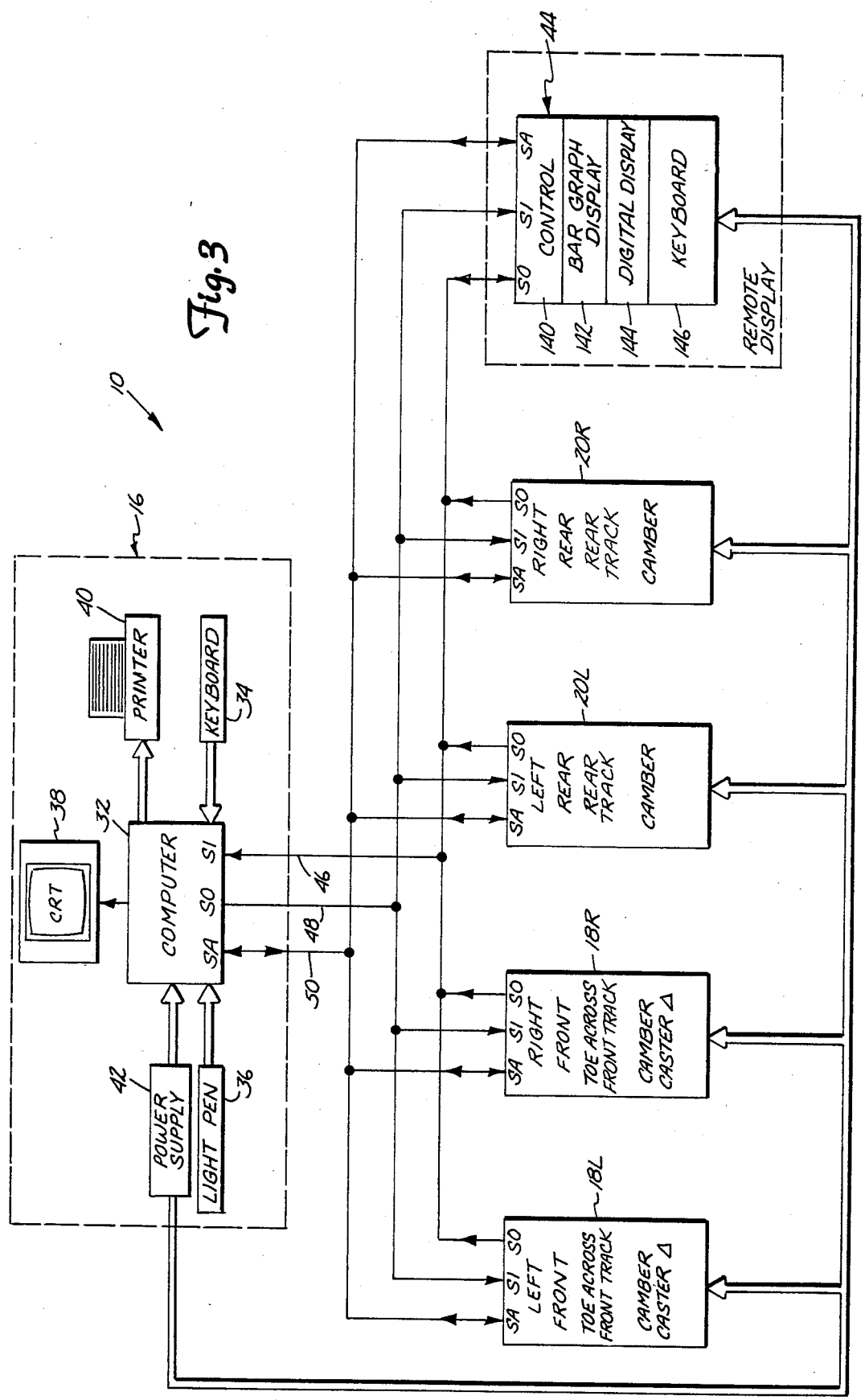

WHEEL ALIGNMENT SYSTEM

BACKGROUND OF THE INVENTION

1. Field of the Invention

The present invention relates to an automatic wheel alignment measurement system and, in particular, an improved system for making toe measurements.

2. Description of the Prior Art

Proper alignment of the wheels of an automotive vehicle is important both for proper handling of the vehicle, as well as proper tire wear. The wheel alignment parameters which are measured and adjusted in order to achieve proper wheel alignment are camber, caster, steering axis inclination (SAI) and toe.

Camber is defined as the angle which the wheel makes with respect to a vertical plane when looking at the wheel from either the front or the rear of the automobile. Any wheel of an automobile can have camber.

Caster is an angle which the steering axis of a steerable wheel (typically one of the front wheels makes with respect to the vertical plane which is perpendicular to the longitudinal direction of the automobile.

Steering axis inclination (SAI) is the inclination of the steering axis with respect to a vertical plane which is parallel to the longitudinal direction of the automobile.

Toe was originally defined as the difference of the distance between the front edges of two opposite wheels and the distance between the rear edges of the same two wheels. Toe can also be defined in terms of an angular relationship of the plane of a wheel (perpendicular to its turning axis) relative to a predetermined longitudinal vehicle axis. When the forwardmost portions of a pair of adjacent wheels are closer together than the rear portions of those wheels, they are commonly referred to as in a "toe-in" condition. When the rear portions of wheels are closer together than the front portions, the condition is commonly referred to as "toe-out."

Camber is a tire wearing angle and also affects handling of the automobile. Caster and SAI do not affect tire wear, but are important for directional control. Toe is a tire wearing angle and also affects the position of the steering wheel required in order to maintain the automobile along a straight line.

Camber, caster and SAI are typically measured using one or more inclinometers which are attached to the wheel. With camber, the inclinometer measures the angle that the spindle makes with horizontal. With caster, the wheel is turned through an arc, and the difference in the camber readings is used to derive the caster value. SAI is measured in a manner similar to caster, except that the inclinometer used for the SAI reading is aligned at 90-degrees to the inclinometer used for reading camber and caster.

The camber, caster and SAI measurements can be made manually with visual inspection and reading, or can be provided on an automatic basis. U.S. Pat. No. 3,913,236 by Butler describes a sensing head which uses gravity sensing variable impedance electrolyte transducers which are connected in a bridge circuit to indicate the angle of the transducer to horizontal.

Over the years, there have been numerous approaches taken to measurement of toe. Initially, manual techniques were used in which the distances between the front edge of the wheels and the rear edges of the wheels were measured and compared. The tie rod turn buckles were adjusted to set the proper amount of toe, and the vehicle was then taken for a test drive to see how the vehicle handled. This approach obviously was time consuming and highly dependent upon the skill of the mechanic.

Various automated toe measurement systems have been developed. One type of system uses head units which are attached to various wheels and which are interconnected by cables or cords. The angles of the head units, and thus the wheels, with respect to the cords are measured by an electromechanical transducer. Examples of this type of measurement device are shown in the Hunter U.S. Pat. No. 4,016,208, the Senften U.S. Pat. No. 4,034,479 and in U.K. Patent Application No. 2,025,064.

Another approach whicH has been used in the past involves optical sensing. Examples of optical systems include the Senften U.S. Pat. No. 3,782,831, the Senften U.S. Pat. No. 3,892,042, the Florer et al U.S. Pat. No. 4,095,902, the Senften U.S. Pat. No. 4,126,943, the Pelta U.S. Pat. No. 4,138,825, the Lill U.S. Pat. No. 4,143,970, the Hunter U.S. Pat. No. 4,302,104 and the Grossman et al U.S. Pat. No. 4,319,838.

There is a continuing need for improved toe measurement systems which are easy to set up, which provide improved accuracy, are lower in cost and are less complex than the prior art mechanical and optical systems.

SUMMARY OF THE INVENTION

The wheel alignment measurement system of the present invention measures the angular relationship of a wheel of a vehicle using a head unit which is positioned in a predetermined relationship to the vehicle wheel and a target which is mounted in a predetermined relationship to another wheel of the vehicle. The head unit includes an image array sensing means which is carried by the head unit and which produces pixel signals representative of picture elements of a field of view. The head unit and target are positioned so that the position of the target image within the field of view of the image array sensing means is dependent upon the angular position of the wheel to which the head unit is mounted.

The apparatus also includes means for analyzing the target image based upon the pixel signals from the image array sensing means to determine the position of the target image within the field of view and means for deriving an angular relationship of the wheel based upon that determined position of the target image within the field of view.

In preferred embodiments of the present invention, head units are mounted on all four wheels of a vehicle, and target are carried by all of the head units so that they can be sensed by an image array sensing means of one of the other head units. Either two-wheel or four-wheel toe measurements can be performed using the angular relationships derived based upon the location of the center of each target image with respect to the field of view of the image array sensing means of one of the other head units.

BRIEF DESCRIPTION OF THE DRAWINGS

FIG. 1 is a perspective view of the alignment apparatus of the present invention.

FIGS. 2A, 2B and 2C are left side, right side and rear elevational views, respectively, of the left front head unit of the apparatus of FIG. 1.

FIG. 3 is an electrical block diagram of the apparatus in FIG. 1.

DETAILED DESCRIPTION OF THE PREFERRED EMBODIMENTS

Figure 4A:
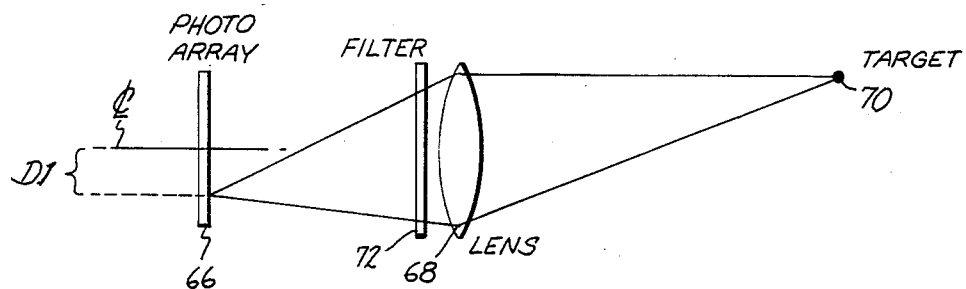
FIGS. 4A and 4B are diagrams illustrating the change of position of a target image on a photodetector array as a function of change of toe angle of the wheel.

In FIG. 1, wheel alignment system 10 of the present invention is used to measure the alignment of left front wheel 12L, right front wheel 12R (shown in phantom), left rear wheel 14L and right rear wheel 14R (shown in phantom) of an automotive vehicle. For clarity, the remaining portions of the vehicle are not shown. System 10 includes a main console 16, left and right front head units 18L and 18R, and left and right rear head units 20L and 20R. Head units 18L, 18R, 20L and 20R are connected to main console 16 by multiconductor electrical signal transmission cables (not shown). FIGS. 2A-2C show head unit 18L in further detail.

Head units 18L, 18R, 20L and 20R are supported on wheels 12L, 12R, 14L and 14R by rim clamps 22L, 22R, 24L and 24R, respectively. Rim clamps 22L, 22R, 24L and 24R are self-centering, four-leg rim clamps which fit a wide range of different wheel sizes without the need for special adaptors. Each head unit (18L, 18R, 20L, 20R) includes a housing 25, a sleeve 26 and an arm 27. Sleeve 26 mounts over a spindle of the corresponding rim clamp. Each head unit (18L, 18R, 20L, 20R) is locked into position on the spindle of the corresponding rim clamp (22L, 22R, 24L, 24R) by spindle clamp 28. A bubble level 29 mounted on arm 27 provides a visual indication to the mechanic that the head unit (18L, 18R, 20L, 20R) is level horizontally before spindle clamp 28 is clamped. A set of switches 30 on housing 25 allows the mechanic to signal main console 16 that a measurement is made and to respond to messages displayed by main console 16.

As shown in FIG. 3, main console 16 includes computer 32, which has keyboard 34 and bar code scanning light pen 36 as input devices and has CRT display 38 and printer 40 as output devices. Power supply 42, which is located within main console 16, supplies power to computer 32 and its input and output devices, and also supplies power to head units 18L, 18R, 20L, 20R and remote display 44.

Computer 32 supplies data and instructions to the head units 18L, 18R, 20L and 20R and receives wheel alignment measurement values from each of the head units. Based upon these measurement values, computer 32 provides wheel alignment output values and other information to the mechanic through CRT display 38 and printer 40. In addition, computer 32 controls remote display 44, which is preferably a hand-held unit which a mechanic can use while adjusting the alignment of any one of the four wheels.

Light pen 36 is used to read vehicle manufacturer's specifications which are recorded in bar code format. These specifications are loaded into computer 32, so that computer 32 can provide indications to the mechanic whether the measured wheel alignment values are within the specification ranges.

Communication between computer 32 and head units 18L, 18R, 20L and 20R, as well as remote display 44, is accomplished through lines 46, 48 and 50. Line 46 connects the serial input (SI) port of computer 32 to the serial output (SO) ports of the head units 18L, 18R, 20L and 20R and the remote display 44. Line 48 connects the serial output (SO) port of computer 32 with the serial input (SI) ports of head units 18L, 18R, 20L and 20R and remote display 44. Line 50 is a serial attention (SA) line or control line connecting the devices to indicate when transmission of serial data is to take place.

In wheel alignment system 10 shown in FIG. 1, there are a total of six angle sensor units used to measure toe angles. Front left head unit 18L carries a left-to-right angle sensor 60L and a front-to-rear angle sensor 62L. Front right head unit 18R carries a right-to-left angle sensor 60R and a front-to-rear angle sensor 62R. Left rear head unit 20L bears a rear-to-front angle sensor 64L, and right rear head unit 20R carries a rear-to-front angle sensor 64R.

The angle sensor units are arranged to operate in pairs. Angle sensors 60L and 60R are mounted at the front ends of arms 27 of front head units 18L and 18R and face one another. Angle sensor 62L is mounted at the rear end of housing 25 of head unit 18L and faces angle sensor 64L which is mounted at the front end of head unit 20L. Similarly, angle sensor 62R of head unit 18R faces angle sensor 64R of head unit 20R.

All six angle sensors 60L, 60R, 62L, 62R, 64L and 64R contain a photodetector array 66, a lens 68 and a target 70. The lens 68 and photodetector array 66 of one of the angle sensors receives light from the target 70 of the other angle sensor which it faces. In other words, angle sensor 60L receives light from the target 70 of angle sensor 60R, and vice versa. Angle sensor 62L receives light from the target 70 of angle sensor 64L, and vice versa. Angle sensor 62R receives light from target 70 of angle sensor 64R, and vice versa.

In each case, target 70 is imaged onto the surface of photodetector array 66 by lens 68. Toe measurement requires that the target 70 be affixed to a stationary object. In this embodiment, the target 70 is affixed to one of the other head units.

The measured angle of the wheel to which the angle sensor is attached is represented by the position of the target image on the surface of photodetector array 66.

Figure 4B:
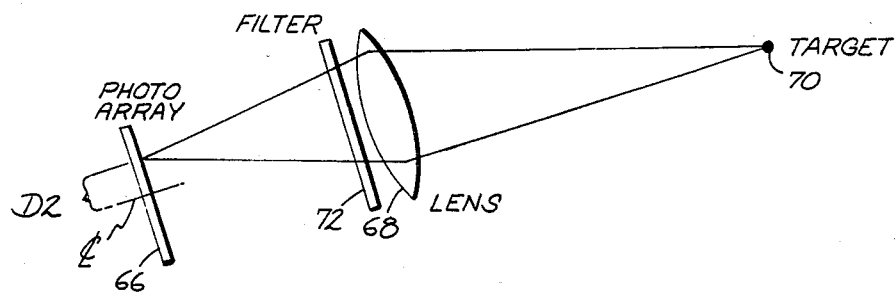

FIGS. 4A and 4B are top views which illustrate diagrammatically the movement of the target image on photodetector array 66 resulting from rotation about a vertical axis of the wheel to which photodetector array 66 is attached. In these illustrations, the distance from lens 68 to target 70 is much shorter than in actual practice. Also, from FIG. 4A to FIG. 4B, the rotation of the wheel to a different angle has been simulated by simply rotating lens 68 and photodetector array 66 about a vertical axis which passes through the center of lens 68. In fact, the vertical axis of rotation of the wheel does not pass through lens 78 in practice. There is a slight outward displacement of lens 68 and photodetector array 66 away from target 70 as well, therefore, which is not illustrated in FIG. 4B. For the purpose of illustration, the outward displacement can be neglected because it is very small compared to the distance from target 70 to lens 68.

As illustrated in FIGS. 4A and 4B, as lens 68 and photodetector array 66 are rotated, the image of the stationary target 70 on photodetector array 66 moves from a position located a distance D1 from centerline C of photodetector array 66 to a position located a distance D2 on the opposite side of centerline C. The distance of the center of the image of target 70 from the centerline C of photodetector array 66 is a function of the angle of the wheel. As will be discussed in further detail later, the processing circuitry within housing 25 of each head unit 18L, 18R, 20L and 20R receives the pixel signals from photodetector array 66, determines the location and center of the target image on photodetector array 66 and provides that data to computer 32 of main console 16. Computer 32 uses the two angle values derived by head unit 18L and the two angle values obtained by unit 18R when two wheel toe alignment is selected. When four wheel toe alignment is desired, computer 30 also uses the angle values from rear head units 20L and 20R. Based upon the angle values received from the head units, computer 32 calculates the toe angles for front wheels 12L and and 12R with respect to a longitudinal axis of the vehicle and, in the case of four wheel alignment, for rear wheels 14L and 14R as well.

In a preferred embodiment, photodetector array 66 is a solid state image sensor such as the IS32 Optic RAM by Micron Technology, Inc., of Boise, Id. The IS32 Optic RAM image sensor is a solid state device which senses an image and translates it into digital computer-compatible signals. The device contains two arrays of 32,768 sensors arranged in 128 rows by 256 columns of sensors. Because the 256 horizontal pixels in adjacent rows are offset by half the pixel spacing, resolution in the horizontal direction (which is the direction of angular measurement in this particular embodiment) of 512 pixels actually is achieved.

Lens 68 is preferably a glass lens having a diameter of 12 mm and a focal length of 18 mm. Lens 68 is positioned approximately at the local distance (18 mm) from photodetector array 66 in this preferred embodiment. This provides a field of view for photodetector array 66 of about 16°.

Target 70 is preferably a light emitting diode (LED) which emits in the infrared portion of the spectrum. In preferred embodiments, a gallium arsenide LED which emits infrared light at a wavelength of about 940 nanometers are used as target 70. In preferred embodiments, band pass filter 72 is also used and is positioned either in front of lens 68 or immediately behind lens 68 as shown in FIGS. 4A and 4B. Filter 72 is preferably an interference type filter with its pass band centered at the wavelength of target 72 (i.e. 940 nm).

In this preferred embodiment, the total field of view of photodetector array 66 in the horizontal dimension is about 16°. Since the resolution is one in 512 pixels, a displacement of the center of the target by one pixel is approximately 1/32°. This provides extremely high accuracy in the sensing of toe angles, which increases the ability to achieve proper toe alignment.

Figure 5:
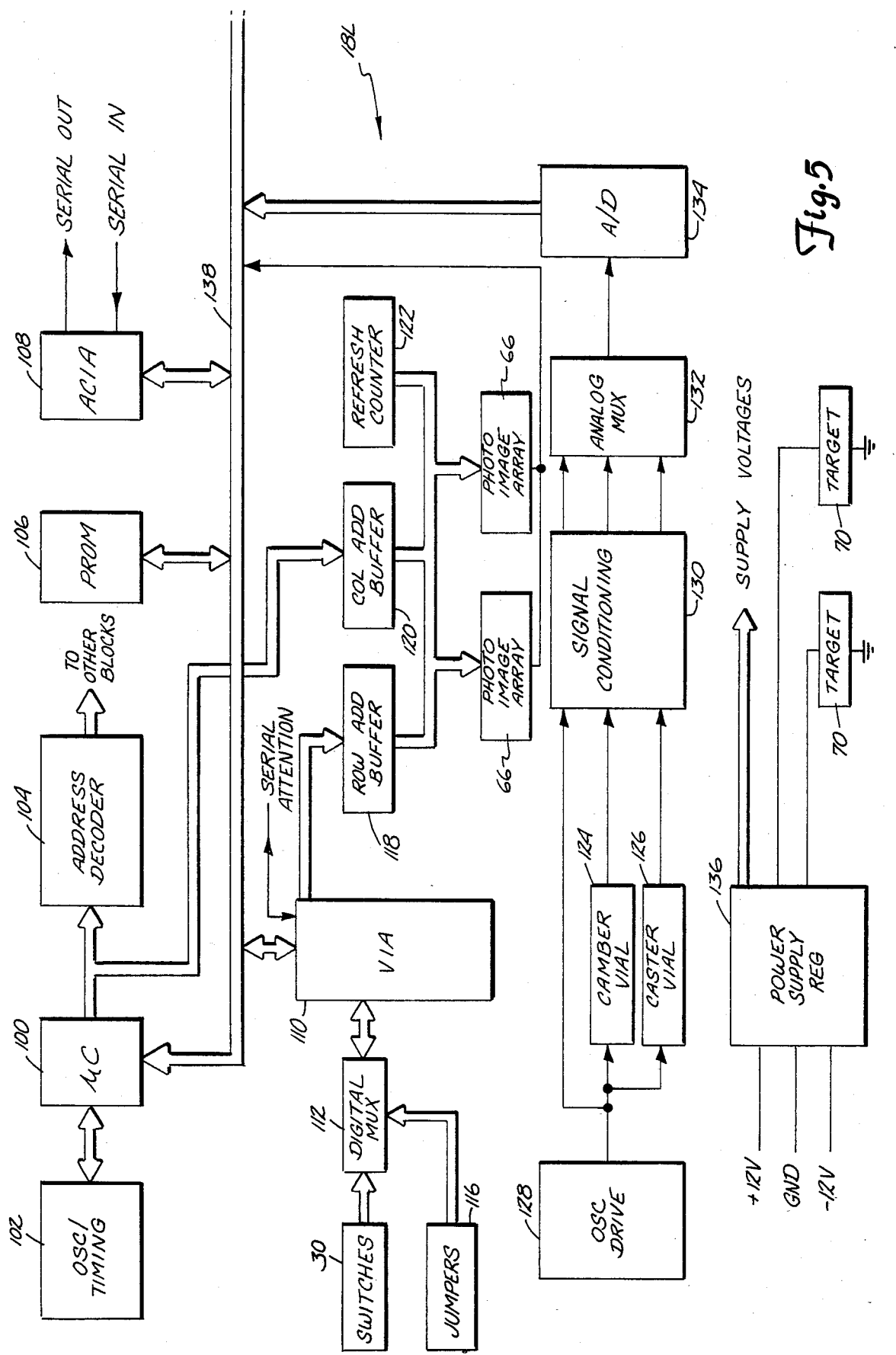
FIG. 5 is an electrical block diagram of the left front head unit of FIG. 1.

FIG. 5 is an electrical block diagram of one of the front head units 18L or 18R. It is also similar to the rear head units 20L ad 20R, except that those units have only one photodetector array 66, only one target LED 70 and do not have a caster sensing vial.

As shown in FIG. 5, head unit 18L includes switches 30, microcomputer 100, oscillator and timing circuit 102, address decoder 104, PROM 106, asynchronous communication interface adapter (ACIA) 108, VIA 110, digital multiplexer 112, jumpers 116, row address buffer 118, column address buffer 120, refresh counter 122, elecrolytic camber sensing vial 124, electrolytic caster sensing vial 126, oscillator and drive circuitry 128, signal conditioning circuitry 130, analog multiplexer 132, analog-to-digital (A/D) converter 134 and power supply regulator 136. Head unit 18L communicates with computer 32 of main console 16 through the serial out (SO), serial in (SI) and serial attention (SA) ports. In addition, power from +12 V, −12 V and ground (GND) lines is supplied from power supply 42 of main console 16 to power supply regulator 136. The necessary voltage levels for operating the remaining circuitry of head unit 18L are provided by power supply regulator 136.

Switches 30 are preferably four membrane or push-button switches. They can be actuated by the mechanic to select a caster, camber or toe alignment measurement, or to respond to prompt messages on CRT display 38 which have been generated by computer 32.

Jumpers 116 provide a code which identifies the particular head unit as being front left head unit 18L. Each one of the other head units 18R, 20L and 20R has a unique code which identifies it when communicating with computer 32. Digital multiplexer 112 receives the input from switches 30 and jumpers 116 and supplies them through VIA 110 to microcomputer 100. The particular codes set by jumpers 116 allows microcomputer 100 to identify those messages received from computer 32 which are directed to that particular head unit. Similarly, microcomputer 100 supplies the code identifying its particular head unit when communicating with computer 32.

Photodetector arrays 66 are addressed by microcomputer 100 through 110, row and address buffers 118 and 120 and refresh counter 122. The data output from photodetector arrays 66 are pixel signals which are supplied to master bus 138 and thereby to microcomputer 100.

A number of variables can affect the size of the target image on photodetector array 66. For example, both the width and the length of the vehicle can affect the spacing between the respective targets 70 and lenses 68, thus varying the focus of the target on the image array 66. In preferred embodiments of the present invention, therefore, microcomputer 100 processes the bits (pixel signals) from the photodetector array 66 to determine the center of the target image in both vertical and horizontal directions. This is done, even though only the position of the target image in the horizontal dimension is required for angle measurement.

Microcomputer 100 causes the photodetector array 66 to be read out so that it starts at the top right corner and effectively scans the contents of the array backwards. This continues until a row is found in which there are three consecutive pixels which have the same value (either "1" or "0") which indicate the presence of the target image. This row is identified as the top of the target image.

Microcomputer 100 then repeats the process beginning from the bottom. When three consecutive pixels have been found indicating the presence of the target image, the particular row in which they appear is identified as the bottom of the target image.

Microcomputer 100 then uses the top and bottom of the target image to determine the center row which passes through the target image. Using that center row, microcomputer 100 starts from the left edge of the array and moves horizontally to the right from pixel to pixel until it finds three consecutive pixels which indicate presence of the target image. The last of the three pixels is selected as the left edge of the target image. The process is then repeated, starting from the right and moving to the left until once again three consecutive pixels are found which indicate the presence of the target image. The last pixel of the three is identified as the right edge of the target image.

Once the right and left edges have been found, the center is derived by microcomputer 100. The displacement of this center of the target image from the center of photodetector array 66 represents a toe angle measured by that head unit.

Caster and camber measurements are made by use of an oscillating signal provided by oscillator and drive circuitry 128 to vials 124 and 126. The oscillator drive signal is also supplied to signal conditioning circuitry 130, together with the outputs from vials 124 and 126. The outputs of signal conditioning circuitry 130 are provided to analog multiplexer 132, which supplies them to A/D converter 134. The digital values representative of measured camber and caster are supplied by A/D converter 134 to microcomputer 100.

Target LEDs 70 are driven directly from power supply regulator circuit 136. They remain on as long as power is being supplied to head unit 18L.

Microcomputer 100 maintains communication with main computer 32 via a serial link. Front left head unit 18L has serial in (SI) and serial out (SO) ports which are connected in parallel with similar ports from the other three head units 18R, 20L and 20R and remote display 44 and are connected to the SO and SI ports of computer 32.

When a signal is present on serial attention line 50, it informs all of the computers that communications are to be initiated, either from the main console 16 or from one of the head units 18L, 18R, 20L and 20R.

For example, when there is a key switch change at one of the head units because the mechanic has depressed one of the switches 30 at that head unit, an interrupt signal is generated on the serial attention line. This interrupts computer 32, which causes computer 32 to poll head units 18L, 18R, 20L and 20R to see which one generated the serial attention pulse and the reason why is was generated. In that case, the head unit which generated the pulse will send back the new switch information.

Similarly, when main console 16 wants to request information from a particular head unit (18L, 18R, 20L or 20R), computer 32 will pulse serial attention line 50 and then will send out the identification code of the particular head unit with which it wishes to communicate. The selected head unit responds with the measured value requested to computer 32.

As shown in FIG. 3, remote display 44 preferably includes control 140, bar graph and digital displays 142 and 144 and keyboard 146. Remote display 44 is a handheld unit which can be carried by the mechanic to the particular wheel on which he is working. Keyboard 144 allows the mechanic to select the particular angle which he wishes to display. The information which is displayed by remote display 44 comes from computer 32. There is no direct communication by remote display 44 with any of the head units 18L, 18R, 20L and 20R.

Left front head unit 18L and right front head unit 18R send information to computer 32 for the toe angles-across-the-front and for the toe (tracking angles)-to-the-rear. In addition, they sense camber angle and caster change angle.

Rear head units 20L and 20R, on the other hand, measure only toe-to-the-front (or tracking-to-the-front) and a camber value. They do not measure caster change or toe angles across the rear of the vehicle.

All communication within system 10 is under the control of master computer 32. Computer 32 will call for angle values from the head units as it needs them. For example, from the six toe angles measured by head units 18L, 18R, 20L and 20R, computer 32 derives a tread centerline and the individual toe angles of the four wheels with respect to that tread centerline. Each head unit (18L, 18R, 20L and 20R) is continually reading the camber and caster change values, as well as toe angle values, in a continuous loop. A head unit will only interrupt the cycle when master computer 32 initiates communication with it for requiring a new alignment angle or if the operator presses one of the switches 30 on that particular head unit. The responses to the actuation of one of the switches 30 are determined by master computer 32.

The system of the present invention provides an extremely accurate yet extremely easy to use system. Photodetector arrays 66, together with the image analysis performed by microcomputer 100, provide much greater resolution than has been possible with either prior art optical or mechanical systems. In addition, the set up of system 10 is much easier, since no cords or cables are needed as in the mechanical measurement systems.

The present invention also takes advantage of the ability of microcomputer 100 at each head unit to analyze the data and continually monitor and update the angles being measured. This allows monitoring to continue as adjustment of toe, camber or caster is taking place.

Use of an infrared LED as target 70 is particularly advantageous, since infrared LEDs are inexpensive, provide an easily sensed target and emit light at a wavelength which is not part of the visible spectrum. Thus, band pass filtering and baffling to remove ambient visible light is possible, without affecting the sensitivity of photodetector array 66 to target 70.

Although, in the preferred embodiment described, target 70 was in the form of a single generally circular or oval LED, the image sensing of photodetector array 66 coupled with the data processing and image analysis capabilities of microcomputer 100, make other angle measurements possible as well, simply by changing the shape of target 70. For example, measurement of camber angles also is possible by use of a vertical line source as target 70. In that case, the line source is imaged on photodetector array 66, and the position of top and bottom ends of the target image are determined both in the horizontal and vertical directions. This provides an indication of the inclination of the target line with respect to photodetector array 66, and thus an indication of the inclination of the wheel to which photodetector array 66 is connected with respect to the stationary target.

Although the present invention has been described with reference to preferred embodiments, workers skilled in the art will recognize that changes may be made in form and detail without departing from the spirit and scope of the invention.

What is claimed is:

1. A system for measuring toe relationships of wheels of a vehicle, the system comprising:
   first, second, third and fourth head units;
   first, second, third and fourth head unit positioning means for positioning the first, second, third and fourth head units in predetermined relationship to first, second, third and fourth wheels of the vehicle, respectively;
   first, second, third and fourth targets for providing first, second, third and fourth target images, respectively, each of the targets being mounted on one of the head units;

first, second, third and fourth image sensor means for receiving target images of the first, second, third and fourth targets, respectively, and producing pixel signals representative of a received target image, each of the image sensor means having a two-dimensional field of view and being carried by one of the head units so that a position of the target image within a field of view of the image sensor means is representative of a toe angle;

means for deriving from the pixel signals an indication of position of the first, second, third and fourth target images within the fields of view of the first, second, third and fourth image sensor means;

means for deriving toe relationships of at least two wheels of the vehicle based upon the indications of the positions of the first, second, third and fourth target images within the fields of view of the first, second, third and fourth image sensor means.

2. The system of claim 1 wherein the first head unit is a left front head unit, the second head unit is a right front head unit, the third head unit is a left rear head unit and the fourth head unit is a right rear head unit, wherein the first and second image sensor means are mounted on the left front head unit, and wherein the third and fourth image sensor means are mounted on the right front head unit, wherein the first target is mounted on the right front head unit, the second target is mounted on the left rear head unit, the third target is mounted on the left front head unit and the fourth target is mounted on the right rear head unit.

3. The system of claim 2 and further comprising:

a fifth target mounted on the left front head unit to provide a fifth target image;

a sixth target mounted on the right front head unit to provide a sixth target image;

fifth image sensor means for receiving a fifth target image of the fifth target and producing pixel signals representative of the received fifth target image, the fifth image sensor means being carried by the left rear head unit so that a position of the fifth target image within a two-dimensional field of view of the fifth image sensor means is representative of a toe angle;

sixth image sensor means for receiving a sixth target image of the sixth target and producing pixel signals representative of the received sixth target image, the sixth image sensor means being carried by the right rear head unit so that a position of the sixth target image within a two-dimensional field of view of the sixth image sensor means is representative of a toe angle;

means for deriving from the pixel signals from the fifth image sensor means an indication of position of the fifth target image within the field of view of the fifth sensor means;

means for deriving from the pixel signals from the sixth image sensor means an indication of position of the sixth target image within the field of view of the sixth image sensor means; and wherein the means for deriving toe relationships also bases the toe relationships upon the indications of the positions of the fifth and sixth target images within the fields of view of the fifth and sixth image sensor means.

4. The system of claim 3 wherein the means for deriving toe relationship derives toe relationships for each of the first, second, third and fourth wheels with respect to a centerline based upon the indications of positions of the first, second, third, fourth, fifth and sixth target images.

5. The system of claim 1 wherein each of the image sensor means comprises a photodetector array and lens means for imaging a target onto the photodetector array.

6. The system of claim 5 wherein the targets are light sources.

7. The system of claim 6 wherein the light sources are infrared emitting devices.

8. A system for measuring angular relationships of wheels of a vehicle, the system comprising:

a left front head unit for mounting on a left front wheel of the vehicle;

a right front head unit for mounting on a right front wheel of the vehicle;

a left rear head unit for mounting on a left rear wheel of the vehicle;

a right rear head unit for mounting on a right rear wheel of the vehicle;

a first target mounted on the right front head unit facing the left front head unit for providing a first target image;

a second target mounted on the left rear head unit and facing the left front head unit for providing a second target image;

a third target mounted on the left front head unit and facing the right front head unit for providing a third target image;

a fourth target mounted on the right rear head unit and facing the right front head unit for providing a fourth target image;

first image sensor means mounted on the left front head unit and facing the right front head unit to receive the first target image of the first target so that a position of the first target image within a two-dimensional field of view of the first image sensor means is representative of an angle of the left front wheel, the first image sensor means providing signals representing picture elements of the field of view of the first image sensor means;

second image sensor means mounted on the left front head unit and facing the left rear head unit to receive the second target image of the second target so that a position of the second target image within a two-dimensional field of view of the second image sensor means is representative of an angle of the left front wheel, second the image sensor means providing signals representing picture elements of the field of view of the second image sensor means;

third image sensor means mounted on the right front head unit and facing the left front head unit to receive the third target image of the third target so that a position of the third target image within a two-dimensional field of view of the third image sensor means is representative of an angle of the right front wheel, the third image sensor means providing signals representing picture elements of the field of view of the third image sensor means;

fourth image sensor means mounted on the right front head unit and facing the right rear head unit to receive the fourth target image of the fourth target so that a position of the fourth target image within a two-dimensional field of view of the fourth image sensor means is representative of an angle of the right front wheel, the fourth image sensor means providing signals representing picture elements of the field of view of the fourth image sensor means;

first image analysis means for determining the position of the first target image within the field of view of the first image sensor means upon the signals from the first image sensor means;

second image analysis means for determining position of the second target image in the field of view of the second image sensor means based upon the signals from the second image sensor means;

third image analysis means for determining position of the third target image in the field of view of the third image sensor means based upon the signals from the third image sensor means;

fourth image analysis means for determining position of the fourth target image within the field of view of the fourth image sensor means based upon the signals from the fourth image sensor means; and means for deriving toe angle values for the left and right front wheels based upon the positions of the first, second, third and fourth target images.

9. The system of claim 8 further comprising:

a fifth target mounted on the left front head unit and facing the left rear head unit for providing a fifth target image;

sixth target mounted on the right front head unit and facing the right rear head unit for providing a sixth target image;

fifth image sensor means mounted on the left rear head unit and facing the left front head unit to receive the fifth target image of the fifth target so that a position of the fifth target image within a two-dimensional field of view of the fifth image sensor means is representative of an angle of the left rear wheel, the fifth image sensor means providing signals representing picture elements of the field of view of the fifth image sensor means;

sixth image sensor means mounted on the right rear head unit and facing the right front head unit to receive the sixth target image of the sixth target so that a position of the sixth target image within a two-dimensional field of view of the sixth image sensor means is representative of and angle of the right rear wheel, the sixth image sensor means providing signals representing picture elements of the field of view of the sixth image sensor means;

fifth image analysis means for determining position of the fifth target image within the field of view of the fifth image sensor means based upon the signals from the fifth image sensor means; and sixth image analysis means for determining position of the sixth target image within the field of view of the sixth image sensor means based upon the signals from the sixth image sensor means.

10. The system of claim 9 wherein the means for deriving toe relationships derives toe relationships of all four wheels of the vehicle based upon positions of the first through sixth target images.

11. The system of claim 8 wherein each of the image analysis means determines position of the target image by locating a center of the target image with respect to a center of the field of view.

12. The system of claim 11 wherein each image analysis means, based upon the signals from the image sensor means, determines a top of the target image, determines a bottom of the target image, determines a center row of the target image based upon the top and bottom edges, determines a left and right edge of the target in the center row, and derives a position of the center of the target image based upon the left and right edges at the center row.

13. The system of claim 8 and further comprising a main console separate from and interconnected with the head units; wherein the first and second image analysis means are carried by the left front head unit, the third and fourth image analysis means are carried by the right front head unit and the means for deriving toe angle values is located at the main console.

14. The system of claim 8 wherein each of the image sensor means comprises a photodetector array and lens means for imaging the target onto the photodetector array.

15. The system of claim 14 wherein the targets are light sources.

16. The system of claim 15 wherein the light sources are infrared emitting devices.

17. A system for measuring an angular relationship of a wheel of a vehicle, the apparatus comprising:

a head unit;

positioning means for positioning the head unit in a predetermined relationship to a vehicle wheel;

a target for providing a target image;

means for mounting the target in a predetermined relationship to another wheel of the vehicle;

image sensor means carried by the head unit for producing pixel signals representative of picture elements of a two-dimensional field of view of the image sensor means, the image sensor means being carried by the head unit and positioned so that a position of the target image of the target within the field of view of the image sensor means is dependent upon angular position of the wheel to which the head unit is mounted; and means for deriving an angular relationship of the wheel based upon the pixel signals.

18. the system of claim 17 wherein the means for deriving an angular relationship comprises:

image analysis means for determining the position of the target image within the field of view based upon the pixel signals; and means for deriving the angular relationship based upon the position.

19. The system of claim 18 wherein the image analysis means determines position of the target image by locating a center of the target image with respect to a center of the field of view.

20. The system of claim 19 wherein the image analysis means, based upon the signals from the image sensor means, determines a top of the target image, determines a bottom of the target image, determines a center row of the target image based upon the top and bottom edges, determines a left and right edge of the target in the center row, and derives a position of the center of the target image based upon the left and right edges at the center row.

* * * * *